United States Patent [19]

Hammer et al.

[11] Patent Number: 4,546,279
[45] Date of Patent: Oct. 8, 1985

[54] DYNAMOELECTRIC MACHINE WITH ROTOR VENTILATION SYSTEM INCLUDING EXHAUST COOLANT GAS DIFFUSER AND NOISE BAFFLE

[75] Inventors: Joel B. Hammer, Plum Borough; Richard A. Gronholm, East Pittsburgh, both of Pa.

[73] Assignee: Westinghouse Electric Corp., Pittsburgh, Pa.

[21] Appl. No.: 607,853

[22] Filed: May 7, 1984

[51] Int. Cl.⁴ ............................................. H02K 9/00
[52] U.S. Cl. ...................................... 310/59; 310/52; 310/54; 310/64; 310/260; 310/270
[58] Field of Search .................. 310/260, 270, 52, 53, 310/54, 55, 57, 58, 59, 60 R, 64, 65, 214, 51, 61, 60 A

[56] References Cited

U.S. PATENT DOCUMENTS

| 2,618,756 | 11/1952 | Fechheimer | 310/54 |
| 2,873,393 | 2/1959 | Baudry | 310/55 |
| 3,110,827 | 11/1963 | Baudry | 310/55 |

FOREIGN PATENT DOCUMENTS

| 0389765 | 7/1965 | Switzerland | 310/260 |
| 0381132 | 5/1973 | U.S.S.R. | 310/260 |

Primary Examiner—R. Skudy
Attorney, Agent, or Firm—G. H. Telfer

[57] ABSTRACT

An electrical machine with a radial path air-cooled rotor is provided with a stator end turn shell structure of a smoothly curved configuration that, with a like smoothly curved configuration on the outer wall of the air inlet duct, smooths and facilitates air flow through the exhaust passage and serves as a gas diffuser and noise baffle.

6 Claims, 2 Drawing Figures

DYNAMOELECTRIC MACHINE WITH ROTOR VENTILATION SYSTEM INCLUDING EXHAUST COOLANT GAS DIFFUSER AND NOISE BAFFLE The Government has rights in this invention pursuant to Contract No. N00024-79-C-4175 awarded by the Department of the Navy.

BACKGROUND AND SUMMARY OF THE INVENTION

This invention relates to dynamoelectric machines with a radial path, air cooled rotor and particularly to means for improving coolant flow therethrough.

The subject matter of commonly assigned applications Ser. No. 552,592, filed Nov. 16, 1983, by Pavlik et al., now U.S. Pat. No. 4,508,985, and Ser. No. 607,854, filed of even date herewith by Hammer et al. is incorporated herein by reference.

In the earlier copending application are described the general characteristics of machines with radial path air cooled rotors as they have been made heretofore and an improvement thereto for providing better flow into slot channels by means of a channel inlet fairing. This provides better cooling of the rotor so that machine size and noise can be reduced. The present invention has to do with machines of the same general character but with another aspect for improving coolant flow and reducing machine size and noise.

In addition, the above-mentioned second application relates to other features for similar purposes. It is advantageous to employ the features of the above-mentioned applications, either individually or together, with those of the present invention. However, any of such features may be individually used to improve the cooling of machines.

In machines with radial air cooling of the rotor in accordance with the prior art, the air flows radially inward through a stationary inlet duct to the retaining ring and field winding end turns. Part of the air flows axially and radially outward, cooling the end turns and then exiting through the retaining ring. The remaining air passes into the field winding subslots, and hence radially outward through a number of slits in the field winding, cooling the body portion of the winding. The air then exits through radial holes in the rotor wedges and enters the air gap. The air from the body portion of the winding flows axially and circumferentially along the air gap and joins the air from the end turn portion of the winding. This combined exhaust flow then exits through the enclosure to a cooler where heat is removed and the air recirculated.

In such machines, the rotor itself is a blower which must produce the required pressure-volume characteristics to obtain the desired flow. If the rotor is unable to meet the requirements for air flow, prior practice has dictated that rotor mounted blowers be employed, necessarily and disadvantageously increasing the machine weight and size, airborne noise levels, and power consumption.

The present invention offers a means to approximately double the available driving differential static pressure produced by the rotor as compared to an otherwise like machine.

The air flow path is improved by adding a smooth arcuate shell structure, preferably made of insulating material, to the stator end turns and to similarly curve the configuration of a portion of the exhaust side of the inlet duct to form a diffuser for the exhaust gas from the retaining ring and air gap. The diffuser also serves as a noise baffle.

The shell structure around the stator end turns prevents air from impinging thereon and means that the coolant gas dynamic pressure resulting from rotor rotation is converted into useful static pressure utilized to induce the required gas flow without additional total temperature rise in the cooling gas. Also, noise generated by air chopping or modulation caused by gas jets flowing from the retaining ring vent holes and impinging upon the stator end turns is eliminated by the stator end turn shell structure which provides a smooth continuous surface.

In a specific embodiment of preferred design, the stator of the machine is one that is of a high power density design, such as with water cooled windings, which requires little cooling gas for the stationary generator components. Hence, the rotor exhaust gas consists of substantially all the originally supplied air to the rotor.

In preferred forms, the combination including the exhaust gas diffuser and noise baffle in accordance with this invention is combined with prewhirl vanes in the inlet duct, a subslot inlet fairing, and with variably dimensioned wedge openings in the slot portion of the machine so as to result in greater overall improvement.

DESCRIPTION OF THE PREFERRED EMBODIMENTS

Figure 1:
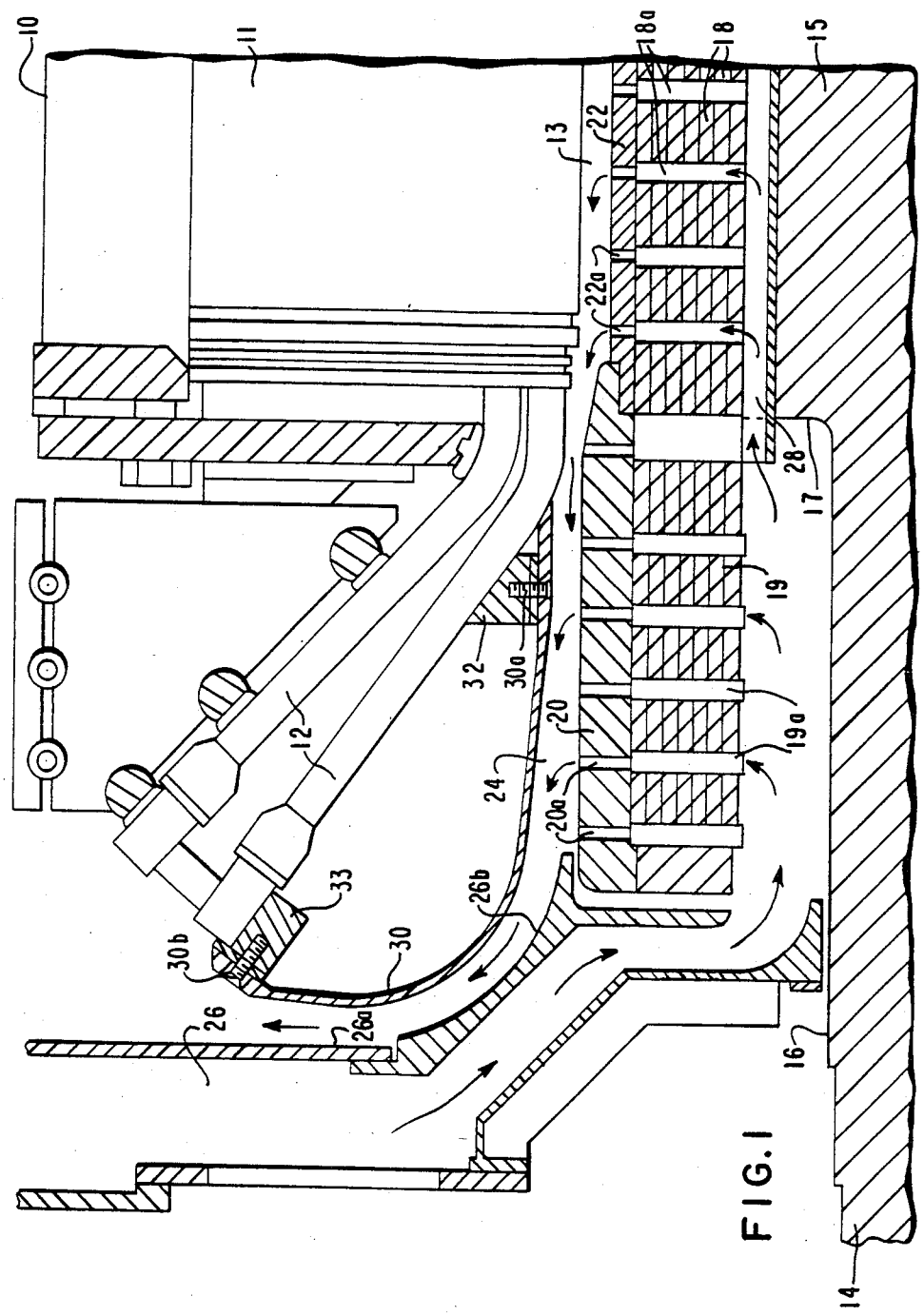
FIG. 1 is a cross-sectional view of a portion of the end turn region of a dynamoelectric machine in accordance with an embodiment of the present invention; and, FIG. 2 is a view of a structure similar to that of FIG. 1 but with further modifications.

Referring to FIG. 1, a dynamoelectric machine is shown with a stator 10 having a core 11 and coil windings 12 of which the end turns are shown extending axially beyond ends of the core. The view is of the upper portion of one end of such a machine. A rotor 14 is centrally disposed on a shaft 16 for rotation within the stator 10 with an air gap 13 therebetween. The rotor has a body portion 15 with axially opposing end faces, of which a portion of one end face 17 is shown. The body portion 15 has a plurality of axially extending coil slots through one of which the sectional view is made. In each of the coil slots are located of coils 18 of a number of conductive turns with end turns 19 extending axially beyond the end face 17.

A retaining ring 20 is located radially around the rotor end turns 19 at each end of the machine. A wedge 22 closes each coil slot in the rotor body 15. There are radial coolant passages 18a, 19a, 20a, and 22a, respectively, through the inner portion of the rotor coils 18, the end turns 19, the retaining ring 20 and the wedge 22. Passages 18a and 22a directly communicate to the air gap 13. Passages 19a and 20a directly communicate to an exhaust passage 24 that is axially outward from the air gap 13.

For a more complete overall view of a machine of the same general character, reference is made to the above-mentioned application Ser. No. 552,592, now U.S. Pat. No. 4,508,985.

FIG. 1 further shows a coolant inlet duct 26 for supplying a coolant gas such as air to radially inward ends of the end turn coolant passages 19a and also to a channel 28 extending through the coil slot to the radial inward ends of the coolant passages 18a in the body portion. Air flow direction is shown by the arrows. The air comes radially inward through the inlet duct 26 and axially under the end turns 19. Some of the air enters the slot channel 28. Thus, air passes through each of the radially extending coolant passages 19a-20a of the end turns 19 and retaining ring 20 as well as passages 18a-22a of the coils 18 in the body and the wedge 22.

The exit air in the air gap 13 and from the retaining ring passages 20a comes together radially outside of the retaining ring 20 in outlet passage 24 and then goes to a cooler from which it is recirculated.

The principal improvement provided by this invention is that the stator end turns 12 have a shell structure 30 around them as shown with a smoothly curved configuration. An inner portion 30a of the shell structure 30 is affixed, such as to support member 32, near the inner end of stator end turns 12 and an outer portion 30b is affixed, such as to support member 33, proximate the outer extremity of the end turns 12. The shell 30 is continuous around the end of the machine so that the outlet passages 24 is substantially an annulus.

The shell 30 serves to confine and smooth the outlet passage 24 for coolant that is between shell 30 and the inner wall 26a of the inlet duct 26. The shell 30 substantially shields the stator end turns 12 from coolant passing outward through the passages in the rotor components and confines the coolant to a region proximate the outer surface of the inlet duct wall so the outlet passage 24 is both smooth and restricted to facilitate coolant flow therethrough.

It is preferred that the inlet duct wall 26a have a portion 26b with a smoothly curved configuration substantially parallel with the shell structure 30 to further smooth the flow and facilitate it being exhausted from the rotor. The curved portion 26b of wall 26a is located at the inner end of duct 26 where outlet passage 24 turns.

While the stator end turn shell structure 30 as disclosed can benefit the cooling of such machines in general, it is preferably applied to machines in which the stator 10 is of a high power density type such as one having water cooled stator coils 12 and also one in which the air flow from the rotor body 15 substantially all passes out axially through the air gap 13 rather than flowing into the stator core 11. However, it is still desirable in instances when a small fraction of the rotor air passes out through a stator vent such as in an end pack of the stator core 11, to employ the shell structure in the manner described. Thus, the prime benefits are obtained when substantially all of the air passes through the outlet passage 24 after passing through either the rotor end turns 19 or the rotor coils 18 within the slots.

Figure 2:
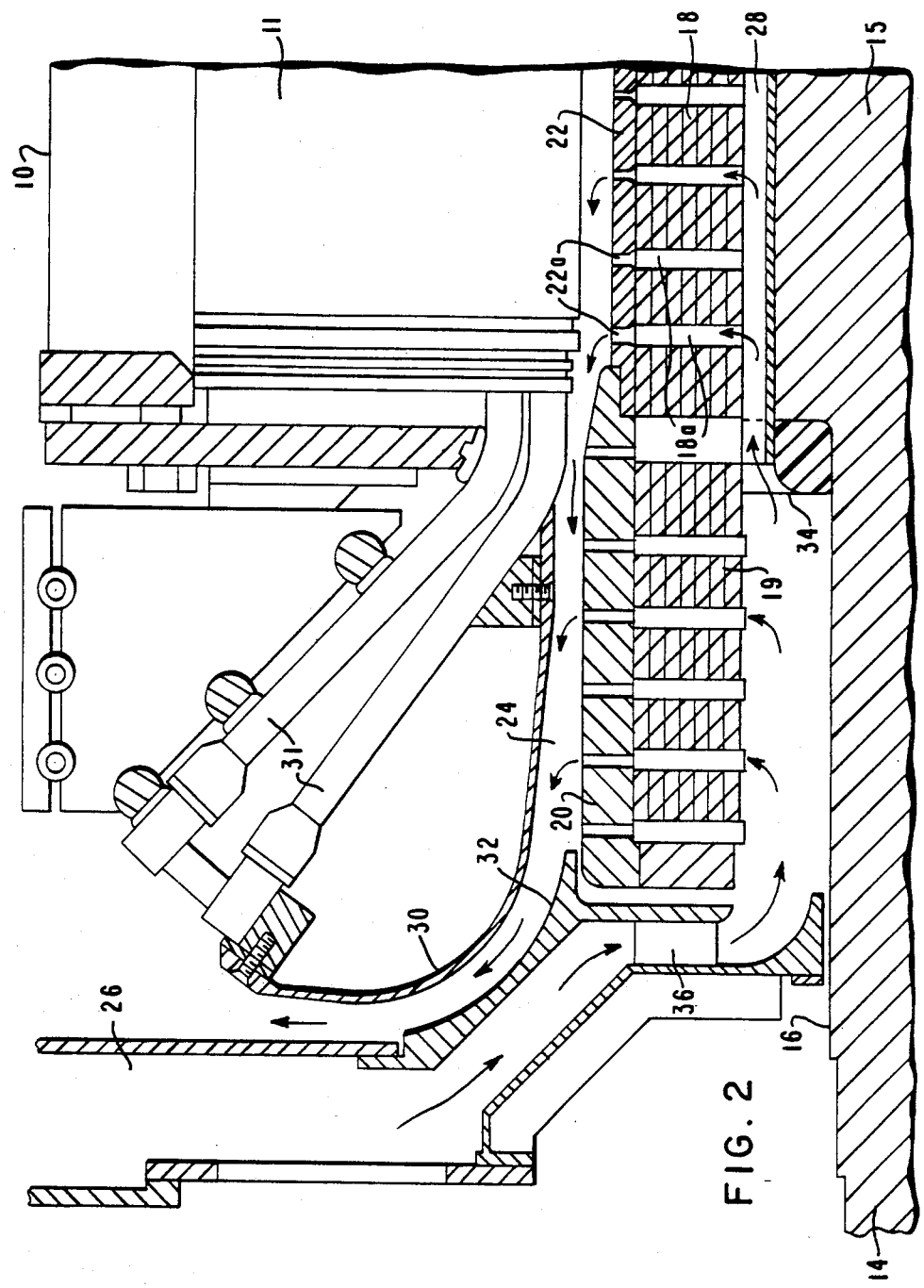

Referring now to FIG. 2, a view of a machine similar to that of FIG. 1 is shown with, however, three individual modifications which may be separately or together used with the structure as depicted in FIG. 1. From present information, all of the features of FIG. 2 would preferably be used together to provide most effective cooling for the machine. The elements of FIG. 2 common to those of FIG. 1 are like numbered.

A first modification in FIG. 2 is that at the inlet to the slot channel 28 in the rotor body 15 there is an inlet fairing 34 for smoothing the flow entrance into the channel 28 in a manner as more particularly described in the above-mentioned application Ser. No. 552,592, now U.S. Pat. No. 4,508,985. The slot channel 28 is formed to fit in the bottom of the coil slot. It has an open interior for air flow and an upper surface that is open for air flow into passages 18a but provides support for coils 18.

A second modification of FIG. 2 as compared to FIG. 1 is that the inlet duct 26 has in it a plurality of guide vanes 36, only generally shown in this view, at the portion of the inlet duct proximate the rotor end turns 19. The guide vanes 36 are a plurality of fixed elements spaced circumferentially in duct 26 and configured in an arrangement as more particularly shown in the application Ser. No. 607,854. They are air foil elements to impart to the entering air a rotational type of motion in the direction of rotation of the rotor which further facilitates the supply of air therein.

A third modification in the view of FIG. 2 as compared to that of FIG. 1 is that the wedge 22 which helps to secure the coils 18 in the coil slots in the rotor body 15 has coolant passages 22a of differing dimensions. As shown, outer ones of passages 22a have a greater cross-sectional area than others of the passages 22a at a central portion of the rotor body. This has been determined to contribute to the uniformity of cooling of the rotor to avoid temperature differentials therein and results in improvement in reduced machine size and noise along with the other improvements of the combination.

The features of the invention contribute to reduction of the need for external blowers since the rotor can be made self pumping due to the increase in driving differential static pressure attained by the shell 30 around the stator end turns 12. Without such external blowers, the machine's bearing span can be reduced for a shorter and lighter machine. Also, airborne noise levels are significantly reduced all of which contributes significantly to the utility of such machines in general but in particular in applications such as for ship board generators.

Noise generated by air chopping of gas flow jets has been reduced thus minimizing the additional weight of noise damping material as has been previously required to be added to the machine enclosure. Also, the size of the heat exchanger used to cool the air prior to recirculation can be smaller since work done on the gas has been reduced.

Therefore, it is seen that the invention as shown and described herein, subject to further variations that are in accordance with the skill of the art of dynamoelectric machine cooling, gives designers new opportunities and design flexibility in achieving compact, lightweight and low noise machines without the sacrifice in machine rating that would be required without the invention.

We claim:

1. A dynamoelectric machine comprising:
   a stator with a core and coil windings having end turns extending axially beyond ends of said core;
   a rotor centrally disposed on a shaft for rotation within said stator;
   said rotor comprising a body portion with axially opposing end faces, said body portion having a plurality of axially extending coil slots in each of which are located coils with end turns extending axially beyond each end of said rotor body portion, said end turns having radially directed coolant passages;
   a retaining ring located radially around said rotor end turns and having radially directed coolant passages communicating with said end turn coolant passages, said retaining ring and said rotor end turns being substantially directly radially inside said stator end turns, a coolant inlet duct for supplying a coolant gas to radially inward ends of said end turn passages, said inlet duct having a first wall axially remote from said end turns and a second wall extending close to said end turns and said retaining ring; and, a stator end turn shell structure having a smoothly curved configuration with an inner portion affixed to said stator end turns proximate said core and an outer portion affixed to said stator end turns proximate the axially outer extremity of said end turns, said shell structure substantially shielding said stator end turns from coolant passing outward through said passages of said rotor end turns and said retaining ring and confining coolant so passing to a region proximate an outer surface of said inlet duct second wall to define an outlet passage facilitating coolant flow therethrough.

2. A dynamoelectric machine in accordance with claim 1 wherein:

said outer surface of said inlet duct second wall has a portion with a smoothly curved configuration substantially parallel with said shell structure for further facilitating coolant flow through said outlet passage.

3. A dynamoelectric machine in accordance with claim 1 wherein:

said rotor coils within said slots also have radially directed coolant passages supplied a coolant gas by said inlet duct and coolant flowing therethrough joins that through said end turns in said outlet passage.

4. A dynamoelectric machine in accordance with claim 3 wherein said stator coil windings are water cooled;

said coolant gas supplied by said inlet duct is air and substantially all of said air passes through said outlet passage after passing through said rotor end turns and said rotor coils within said slots.

5. A dynamoelectric machine in accordance with claim 4 wherein: said coolant inlet duct has a plurality of guide vanes therein for imparting rotational type movement to air passing therethrough in the direction of rotation of said rotor.

6. A dynamoelectric machine in accordance with claim 3 wherein: said rotor slots each have a wedge at the outer portion thereof for assisting in securing said rotor coils therein, said wedge has radially directed coolant passages communicating with those of said rotor coils, and said wedge coolant passages are of differing size with greater cross sectional area in one of said passages proximate the end of said rotor body than in others of said passages at a central portion of said rotor body.

* * * * *